United States Patent [19]

Jang

[11] Patent Number: 5,268,012
[45] Date of Patent: Dec. 7, 1993

[54] FUME EXTRACTOR

[76] Inventor: Sun-Sing Jang, 650, Yuan-Huan E. Rd., Fong-Yuan, Taichung Hsien, Taiwan

[21] Appl. No.: 10,875

[22] Filed: Jan. 29, 1993

[51] Int. Cl.⁵ ............................................. B01D 46/02
[52] U.S. Cl. ....................................... 55/471; 55/472; 55/498; 55/501; 55/508; 55/DIG. 36; 126/299 D
[58] Field of Search ................. 55/471, 472, 473, 492, 55/498, 501, 506, 508, DIG. 36; 126/299 D

[56] References Cited

U.S. PATENT DOCUMENTS

| 3,308,610 | 3/1967 | Springer et al. | 55/471 |
| 4,411,675 | 10/1983 | de Castella | 55/DIG. 36 X |
| 4,500,331 | 2/1985 | Cheng | 55/DIG. 36 X |
| 5,120,331 | 6/1992 | Landy | 55/473 X |

Primary Examiner—Charles Hart
Attorney, Agent, or Firm—Browdy and Neimark

[57] ABSTRACT

A fume extractor comprises a housing and a predetermined number of suction devices. The housing has a bottom board provided with fume sucking ports. Each of the suction devices comprises a motor provided with a rotating shaft upon which a wind impeller is mounted in such a manner that the wind impeller is corresponding in location to the fume sucking ports of the housing. Each of the suction devices is further provided with a filtration member having a top segment and a bottom segment which are fastened respectively to a top board and a bottom board of the housing. The filtration member has an inner wall that is located at a distance from the wind impeller. The housing is further provided with a plurality of exhausting holes.

6 Claims, 3 Drawing Sheets

FUME EXTRACTOR

FIELD OF THE INVENTION

The present invention relates to a kitchen smoke or fume extractor.

BACKGROUND OF THE INVENTION

The conventional fume extractor is generally provided with an exhaust pipe that is attached securely to the housing of the fume extractor. Such an exhaust pipe is used in conjunction with an impeller for expelling the fume. The conventional fume exhausting machine as described above is defective in design in that it is incapable of purifying the exhaust fume so as to minimize the risk that the fume so exhausted becomes a potential source of air pollution.

SUMMARY OF THE INVENTION

It is therefore the primary objective of the present invention to provide a fume extractor with means capable of purifying the fume before it is discharged from the extractor so as to prevent the discharged fume from polluting the air.

The foregoing objective of the present invention will be better understood by studying the following detailed description of three preferred embodiments of the present invention in conjunction with the drawings provided herewith.

DETAILED DESCRIPTION OF THE PREFERRED EMBODIMENTS

Figure 1:
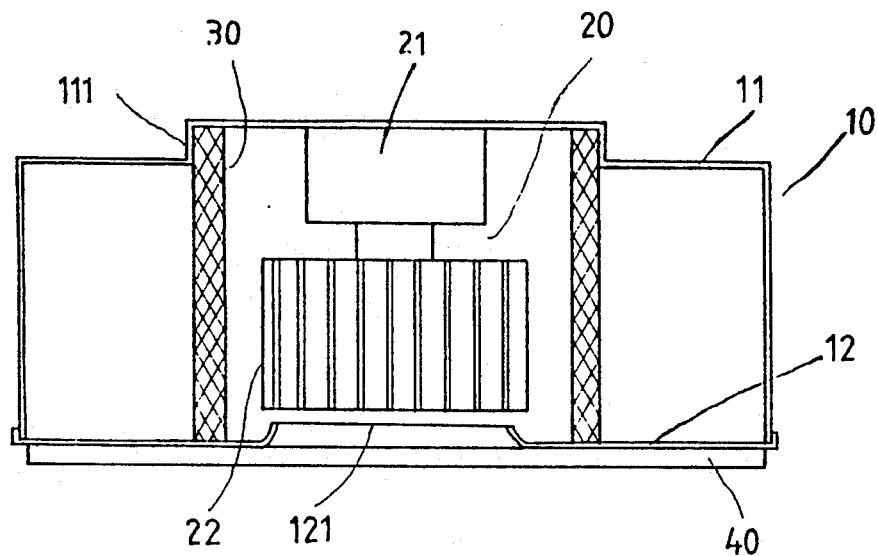
FIG. 1 shows a horizontal cut-away view of a first preferred embodiment of the present invention.
Figure 2:
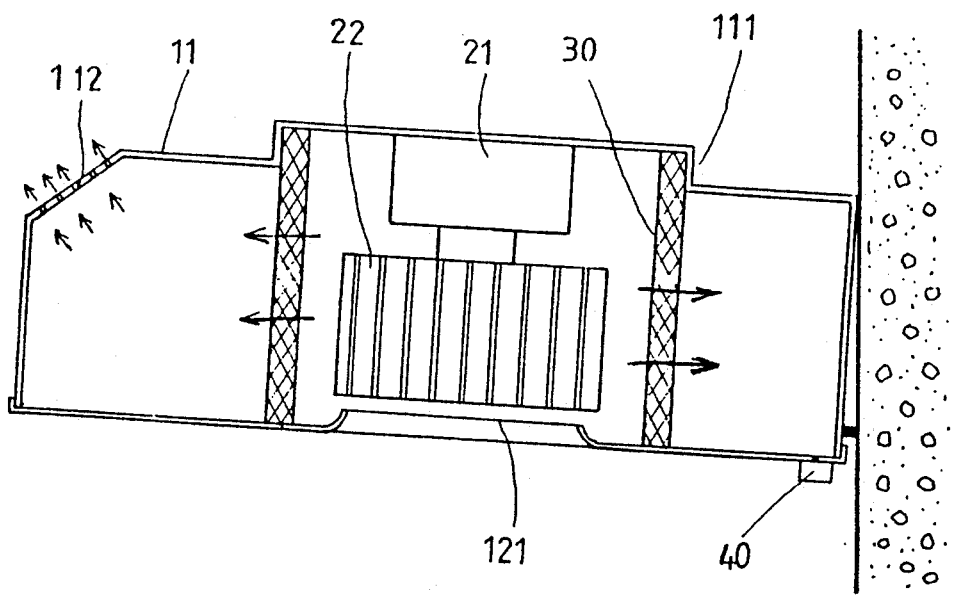
FIG. 2 shows a longitudinal cut-away view of the first preferred embodiment of the present invention.

Referring to FIGS. 1 and 2, a fume extractor embodied in the first preferred embodiment of the present invention is shown to comprise a housing 10, a suction device 20, a filtration member 30, and an oil collecting element 40.

The housing 10 is composed of an upper casing 11 and a bottom board 12. The upper casing 11 has a top board whose underside is provided with a recessed locating mount 111. Located at the front end of the upper casing 11 is a bevel board which is provided with a plurality of exhausting holes 112. The bottom board 12 is provided with a fume sucking port 121.

The suction device 20 is composed of a motor 21 mounted in the locating mount 111 and a wind impeller 22 mounted on a rotating shaft of the motor 21.

The filtration member 30 of a cylindrical construction has a top segment so dimensioned that its outer wall fits securely into the recessed locating mount lll of the housing 10. The bottom of the filtration member 30 is mounted on the bottom board 12. The inner wall of the filtration member 30 is so situated that it remains an appropriate distance from the outer circumference of the wind impeller 22.

The oil collecting element 40 of a trough-like construction is detachably mounted under the rear side of the bottom board 12. Located at the lowest portion of the rear side of the bottom board 12 are a plurality of drip holes corresponding in location to the oil collecting element 40.

The fume containing the oil vapor is forced into the fume sucking port 121 of the bottom board 12 by the suction device 20 and is then purified by the filtration member 30. The purified fume is let out via the exhausting holes 112. The oil vapor trapped by the filtration member 30 is collected in the oil collecting element 40 via the drip holes of the bottom board 12.

Figure 3:
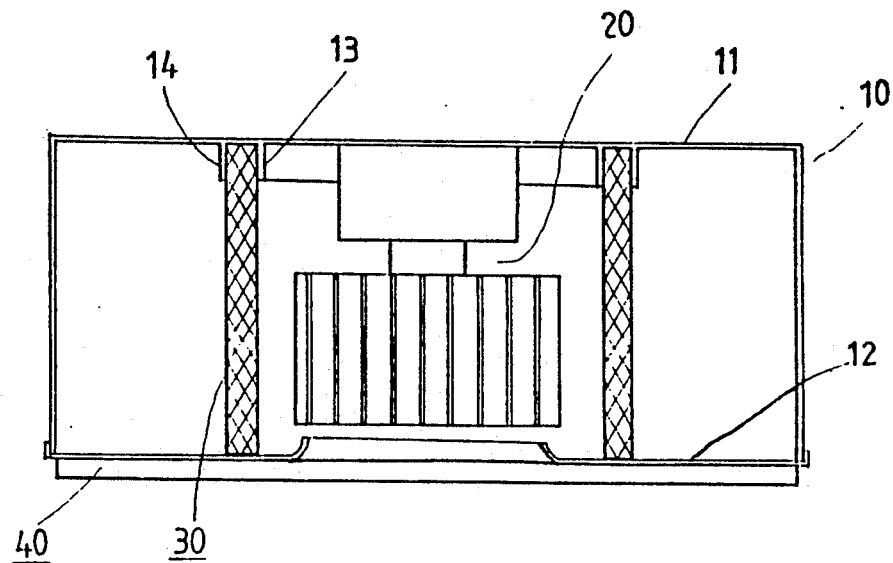
FIG. 3 is a schematic view showing the stuctures of a second preferred embodiment of the present invention.

The second preferred embodiment of the present invention is illustrated in FIG. 3 and is different from the first preferred embodiment of the present invention in that the former has a filtralton member 30 whose top segment is located in a different manner. In other words, the housing 10 of the second preferred embodiment is provided with a top board whose underside is furnished with a first collar 13 and a second collar 14 concentric with the first collar 13. The first collar 13 has an outer diameter slightly smaller than the inner diameter of the filtration member 30 while the second collar 14 has an inner diameter slightly larger than the outer diameter of the filtration member 30. As a result, the top segment of the filtration member 30 of the second preferred embodiment is located between the first collar 13 and the second collar 14.

Figure 4:
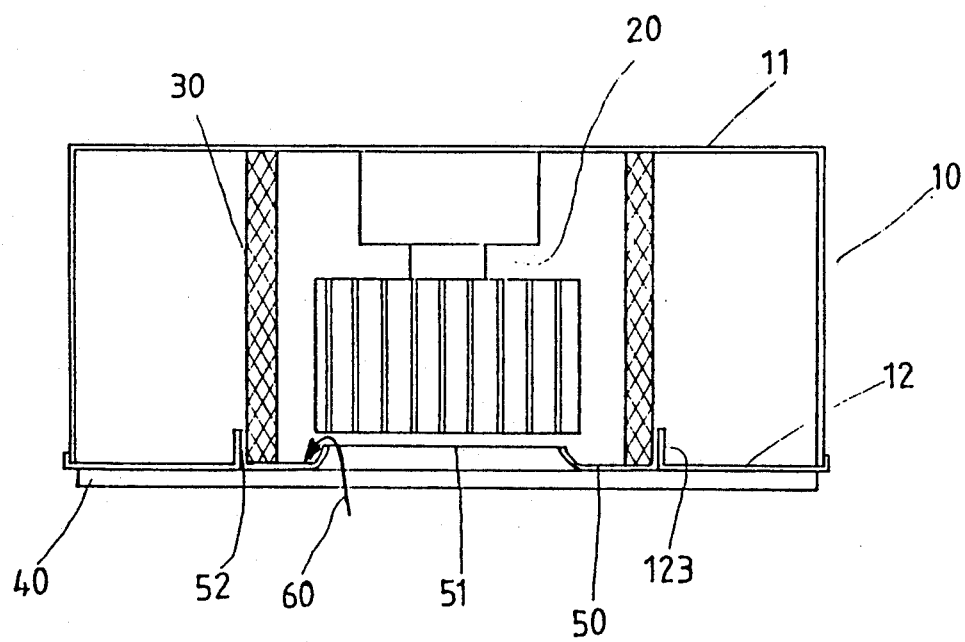
FIG. 4 shows a structural schematic view of a third preferred embodiment of the present invention.
Figure 5:
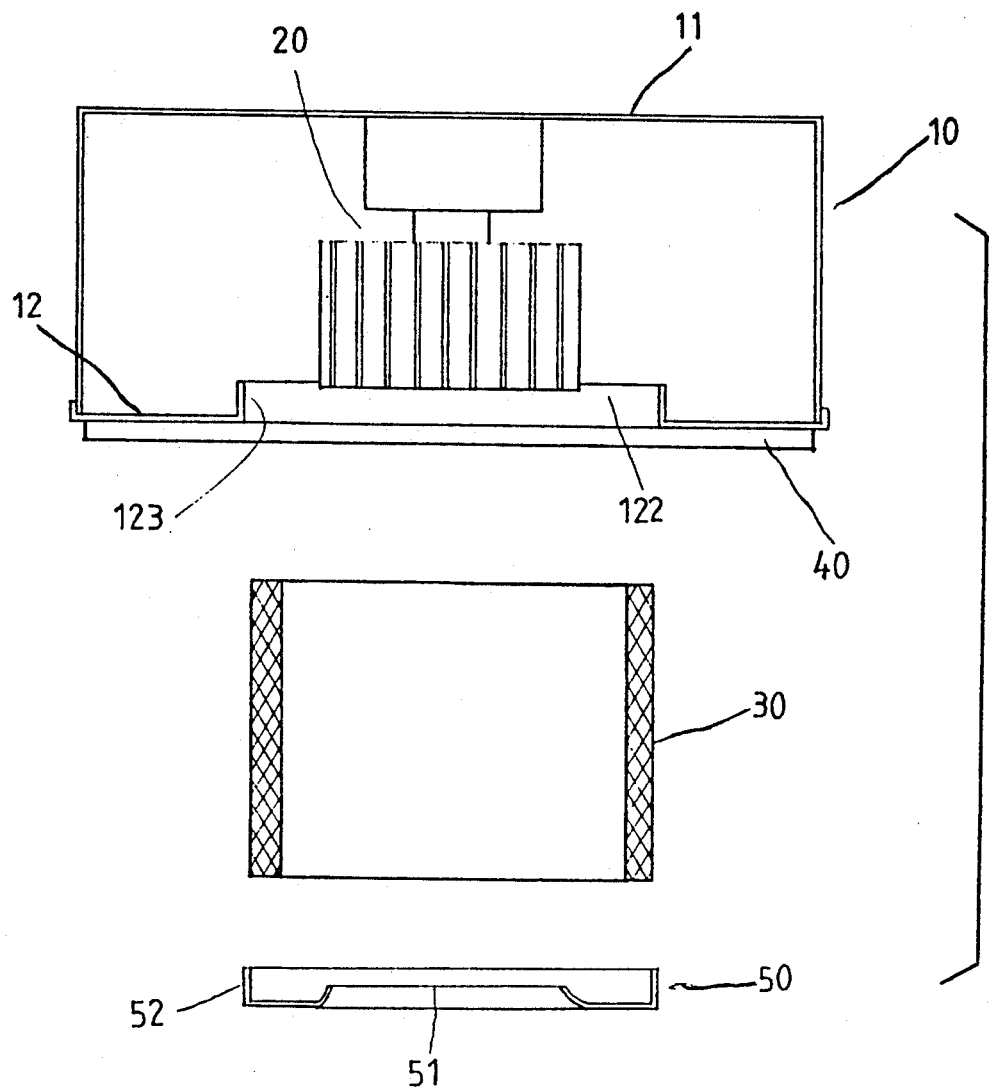
FIG. 5 shows an exploded view of the third preferred embodiment as shown in FIG. 4.

Now referring to FIGS. 4 and 5, the third preferred embodiment of the present invenion is shown to comprise a bottom board 12 which is provided with a large hole 122 having therein a third collar 123 extending upwards from the inner wall of the large hole 122. The third collar 123 is intended for use in holding a locating tray 50 provided at the center thereof with a fume sucking port 51. The locating tray 50 is further provided with a fourth collar 52 extending upwards from the outer circumference of the locating tray 50. The fourth collar 52 has an inner diameter slightly larger than the outer diameter of the filtration member 30. As a result, the lower segment of the filtration member 30 can be insertably mounted in the fourth collar 52 such that the filtration member 30 is put through the large hole 122 of the bottom board 12 and that the fourth collar 52 of the locating tray 50 is insertably mounted and located in the third collar 123. Such a structural arrangement as described above permits an easy and fast removal of an old filtration member 30 due for replacement by inserting one's finger in a direction indicated by an arrow 60 in FIG. 4 to reach for the locating tray 50, which is then pulled downwards to be taken out along with the old filtration member 30 without removing the entire bottom board 12. In order to locate securely and stably the top segment of the filtration member 30 of the third preferred embodiment, the underside of the top board of the upper casing 11 may be provided with a locating mount 111 similar to that of the first preferred embodiment.

Figure 6:
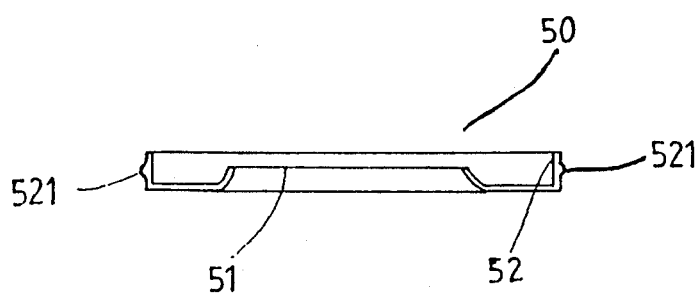
FIG. 6 is a schematic view showing that a locating tray of the third preferred embodiment of the present invention is embodied in another form.

As shown in FIG. 6, the outer wall of the fourth collar 52 of the locating tray 50 of the third preferred embodiment is provided at intervals with a predetermined number of protuberances 521 to facilitate a secure attachment of the fourth collar 52 with the third collar 123. Another modification of the present invention may be made without deviating from the spirit of the present invention. For example, the exhausting holes 112 of the housing 10 may be disposed in the top side, or the left side, or the right side of the housing 10.

All three preferred embodiments of the present invention are provided respectively with one unit of the suction device 20. In fact, they may be furnished with two units of the suction device 20. However, it is suggested that a partition board be used to separate the two filtration members 30. thereby dividing the housing 10 into two air chambers which are not in communication with each other.

While the invention has been described in connection with what is presently considered to be the most practical and preferred embodiments, it is to be understood that the invention is not to be limited to the disclosed embodiments but on the contrary, is intended to cover various moditications and equivalent arrangements included within the spirit and scope of the appended claims whcih scope is to be accorded the broadest interpretation so as to encompass all such modifications and equivalent structures.

What is claimed is:

1. A fume extractor comprising:
   a housing with a receiving space and a bottom board provided with at least one sucking port;
   at least one suction device,
   said suction device having a motor fastened to a top board of said housing and provided with a rotating shaft upon which a wind impeller is mounted in such a manner that said wind impeller is corresponding in location to said at least one sucking port;
   wherein said at least one suction device is provided at a periphery thereof with a filtration member of a cylindrical construction having a top segment and a bottom segment which are fastened respectively to said top board and said bottom board of said housing;
   said filtration member further having an inner wall located at a distance from said wind impeller; said housing is provided at an appropriate location thereof with an exhausting portion having a plurality of exhausting holes; and an oil collecting trap positioned on said bottom board outside an outer wall of said filtration member to collect oil from said filtration member.

2. A fume extractor according to claim 1 wherein said top board of said housing has an underside provided with a recessed locating mount corresponding to said at least one suction device, said locating mount having an inner diameter slightly greater than outer diameter of said filtration member so that said filtration member can be insertably mounted in said locating mount.

3. A fume extractor according to claim 1, wherein said top board of said housing has an underside provided with a first collar corresponding to said at least one suction device, said first collar having an outer diameter slightly smaller than an inner diameter of said filtration member, said first collar being embraced concentrically by a second collar having an inner diameter slightly greater than an outer diameter of said filtration member so that said top segment of said filtration member can be insertably located between said first collar and said second collar.

4. A fume extractor according to claim 1 wherein said bottom board of said housing is provided with a large hole corresponding to said at least one suction device, said large hole having a third collar extending upwards from an inner wall of said large hole to facilitate the mounting of a locating tray which is provided at the center thereof with said at least one fume sucking port and which is provided with a fourth collar extending upwards from an outer circumference of said locating tray having an inner diameter slightly greater than an outer diameter of said filtration member so that said bottom segment of said filtration member can be insertably mounted in said fourth collar in such a manner that said filtration member is put through said large hole of said bottom board of said housing in order to located said fourth collar of said locating tray in said third collar.

5. A fume extractor according to claim 2 wherein said bottom board of said housing is provided with a large hole corresponding to said at least one suction device, said large hole having a third collar extending upwards from an inner wall of said large hole to facilitate the mounting of a locating tray which is provided at the center thereof with said at least one said fume sucking port and which is provided with a fourth collar extending upwards from an outer circumference of said locating tray having an inner diameter slightly greater than an outer diameter of said filtration member so that said bottom segment of said filtration member can be insertably mounted in said fourth collar in such a manner that said filtration member is put through said large hole of said bottom board of said housing in order to locate said fourth collar of said locating tray in said third collar.

6. A fume extractor according to claim 4 wherein said fourth collar of said locating gray is provided at intervals on an outer wall thereof with a predetermined number of protuberances serving to ensure that said fourth collar is securely mounted in said third collar.

* * * * *